Nov. 8, 1960  O. I. BUTLER ET AL  2,959,721
MULTI-PHASE INDUCTION MOTORS
Filed Jan. 30, 1956  6 Sheets-Sheet 1

OLIVER IVOR BUTLER
THOMAS HERBERT BARTON
HENRY STERLING
INVENTORS
BY Bailey, Stephens & Huston
ATTORNEYS

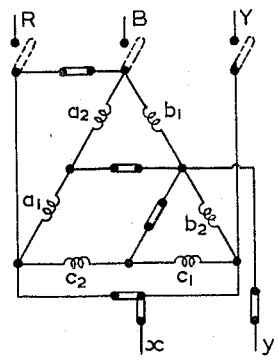
FIG. 12b.
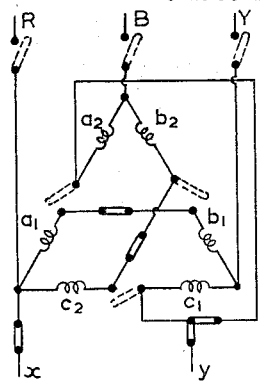
FIG. 13.
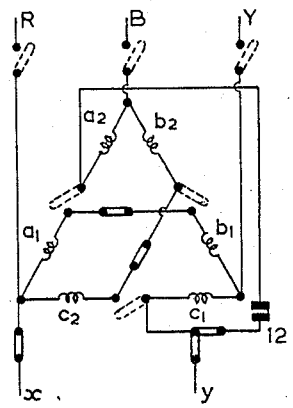
FIG. 14.
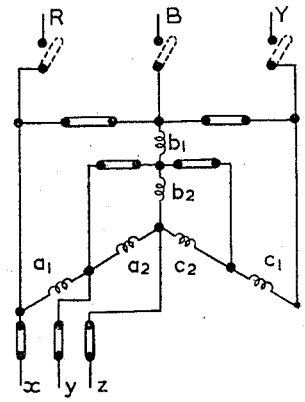
FIG. 15.
FIG. 16.
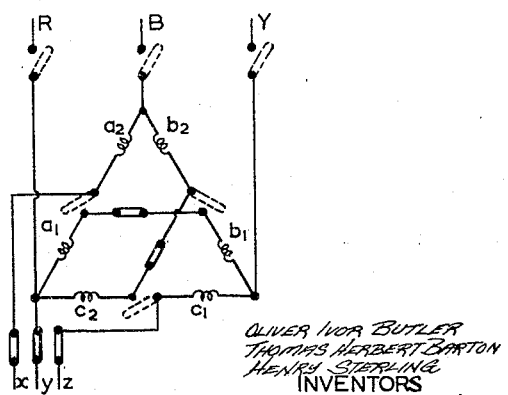

Nov. 8, 1960 O. I. BUTLER ET AL 2,959,721
MULTI-PHASE INDUCTION MOTORS
Filed Jan. 30, 1956 6 Sheets-Sheet 5

OLIVER IVOR BUTLER
THOMAS HERBERT BARTON
HENRY STERLING
INVENTORS
BY
ATTORNEYS

Nov. 8, 1960   O. I. BUTLER ET AL   2,959,721
MULTI-PHASE INDUCTION MOTORS
Filed Jan. 30, 1956   6 Sheets-Sheet 6

OLIVER IVOR BUTLER
THOMAS HERBERT BARTON
HENRY STERLING
INVENTORS
BY
ATTORNEYS

United States Patent Office 2,959,721
Patented Nov. 8, 1960

2,959,721

MULTI-PHASE INDUCTION MOTORS

Oliver I. Butler and Thomas H. Barton, Sheffield, and Henry Sterling, Stretford, Manchester, England, assignors to Lancashire Dynamo & Crypto Limited, Manchester, England Filed Jan. 30, 1956, Ser. No. 562,347

Claims priority, application Great Britain Feb. 9, 1955

6 Claims. (Cl. 318—211)

This invention relates to the speed control of multi-phase induction motors, that is to say either the variation of the speed from one rate of rotation to another, or to bringing the motor to a standstill.

One object of the invention is to enable a multi-phase induction motor to be brought to a standstill without the necessity for any D.C. supply, as is required in the case of D.C. injection braking, and without the necessity for any plugging switch as is required in reversed current braking, the power consumption and motor losses during braking being comparable with these obtaining during D.C. injection braking and much less than those arising in reversed current braking. A further object is to obtain these advantages without materially affecting the cost and size of the motor, this being achieved by making use of the multi-phase primary winding both for normal operation and for braking, thereby making full use of the available winding space.

Another object of the invention is to provide an induction motor arranged to run at at least two speeds without the necessity for furnishing it with more than one multi-phase primary winding thereby enabling the motor to be made about the same size and at about the same cost as a motor only capable of running at one speed.

It is to be understood that the primary winding is usually the stator winding but it may be the rotor winding, in which event it is fed through brushes and slip rings and the secondary winding is then in the stator.

The aforesaid objects are achieved, according to the invention, by providing the motor with a primary winding having each of its phases divided into a number of parts, and with means for supplying the multi-phase current necessary for running the motor at full speed to the full primary winding and for alternatively supplying a second current incorporating a lower number of phases to selected parts of the primary winding, thereby reducing the speed of the motor. Thus the primary winding may be a star-connected or delta-connected three phase winding and each phase may be sub-divided into two halves, each half occupying 30 electrical degrees of the total 60 degree phase belt. Then three of the half-phase windings, one from each phase, may be connected in series or in parallel and supplied with single-phase alternating current so as to produce a pulsating, single-phase magnetic field having three times as many poles as the normal three-phase connection, the three remaining half-phase windings, which are now displaced by 90 electrical degrees from the other half-phase windings, being short circuited. If the motor is provided with a secondary winding whose equivalent resistance during triple-pole operation, is approximately equal to, and preferably greater than the total leakage reactance per triple-pole phase, such an arrangement will bring the motor to a standstill. The term "triple-pole," as used in this specification, means the condition when the primary winding is connected to produce the tripled number of poles in the manner indicated above, as compared with the number of poles during normal three-phase operation. If on the other hand the motor is provided with a low-resistance squirrel-cage rotor, the assistance of a mechanical brake is necessary, but this need only be sufficient to deal with about 10% of the energy to be dissipated in braking. The three half-phase windings that are short-circuited may either be short-circuited completely, or by way of a resistance, a reactance, a capacitance or a combination of such elements. They may be short-circuited by being connected in series, in parallel, or they may be individually short-circuited.

Alternatively, instead of short-circuiting three of the half-phase windings as aforesaid, they may be connected in the same manner as the first three half-phases (either in series or in parallel) and the two circuits obtained in this manner may be connected in parallel across a single-phase supply.

A particularly important adaptation of the invention consists in arranging a three-phase induction motor to run either at full speed by connecting it to a three-phase supply or at one-third speed by feeding the reconnected primary winding with two-phase current. For the latter purpose the three-phase windings are again divided into two groups of half-phase windings, with the halves in each group connected in a similar manner (either in series or in parallel) and this two-phase winding is supplied by an unbalanced or balanced two-phase supply. In this way a rotating magnetic field is produced, which causes the rotor to rotate at one-third of its normal running speed. Such a motor can, of course, be braked regeneratively from full speed to one-third of full speed and then, by reversing the phase rotation of the two-phase supply, the motor may be braked from one-third speed to rest and reaccelerated to one-third speed in the opposite direction.

The blanced and unbalanced two-phase operation indicated above is particularly useful for machine tool drives and for lift and hoist motors. It can also be used with advantage on motors for frequent reversal, by introducing two intermediate switching steps instead of the usual straightforward reversed current switching. This procedure results in a considerable reduction of motor losses and power-consumption during reversal.

In order that the invention may be clearly understood, a number of arrangements in accordance therewith will now be described by way of example, with reference to the diagrams shown in the accompanying Figures 1 to 25, in which:

Fig. 12b is a circuit diagram of a delta stator winding having switch means for connecting six half-phase windings in parallel with each other and to a single-phase A.C. supply;

Fig. 13 is a circuit diagram showing a modification of Fig. 9 in which the remaining half-phase windings are divided into two short-circuited groups;

Fig. 14 is a circuit diagram showing a modification of Fig. 13;

Fig. 15 is a circuit diagram showing an adaptation of Fig. 6 to two-phase supply;

Fig. 16 is a circuit diagram showing an adaptation of Fig. 7 to two-phase supply;

Figs. 18, 19, 20a, 20b and 21 are circuit diagrams respectively showing five further methods of three-phase to two-phase conversion; and Figs. 22, 23, 24 and 25 are circuit diagrams respectively showing four rotor winding assemblies, any one of which may be used in conjunction with any one of the stator windings of Figs. 1 to 5 and 8 to 17.

Figure 1:
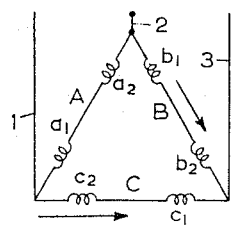
Fig. 1 is a circuit diagram of a delta connected three phase stator winding connected for two-pole operation.
Figure 2:
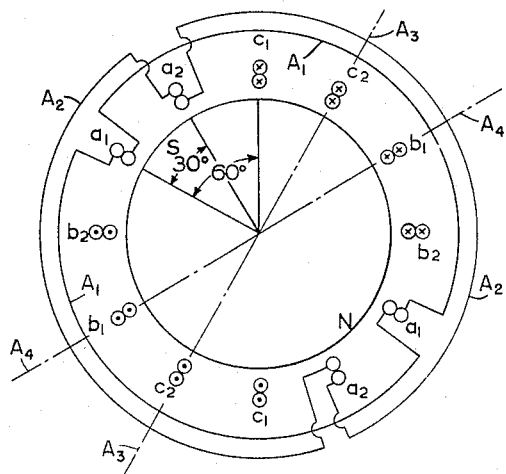
Fig. 2 is a polar diagram of the winding of Fig. 1.
Figure 3:
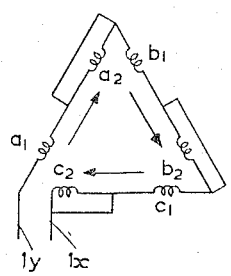
Fig. 3 is a circuit diagram similar to Fig. 1 but showing the winding connected for triple-pole (i.e. six-pole) operation.
Figure 4:
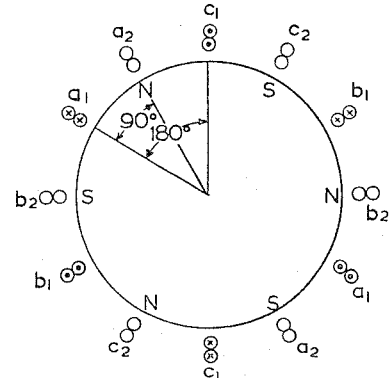
Fig. 4 is a polar diagram of the winding of Fig. 3.
Figure 5:
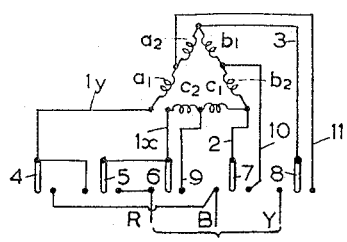
Fig. 5 is a circuit diagram showing switch means for changing over the winding of Figs. 1 to 4 from two-pole to triple-pole operation.

Figures 1 and 2 show a fully-pitched, 2-pole, three-phase, two-layer stator winding, connected in delta, for a three-phase induction motor, having a rotor winding whose equivalent resistance during triple-pole operation is approximately equal to, and preferably greater than, the total leakage reactance per triple-pole phase. This stator winding is of the orthodox form in that it produces the usual rotating magnetic field, but each of its phases A, B, C is divided into two halves $a^1$, $a^2$, $b^1$, $b^2$, $c^1$, $c^2$. At the instant when equal currents are flowing in the phase windings B, C in the direction shown by the arrows (Figure 1) and no current is flowing in the phase winding A, the current is instantaneously circulating in the stator as shown in Figure 2 with the current flowing in one direction in the conductors $c^1$, $c^2$, $b^1$, $b^2$, on one side, and in the opposite direction through the conductors $b^2$, $b^1$, $c^2$, $c^1$, on the other side, so as instantaneously to locate the magnetic poles at the points N, S. The two halves $a^1$, $a^2$ of the phase A have their fully-pitched bars connected by conductors $A^1$, $A^2$, as shown in Figure 2, thereby providing the 30 electrical degree displacement between the two halves $a^1$, $a^2$, that takes place when the motor is supplied with the three phase current necessary for running the motor at full speed. The magnetic axes of these two halves are indicated by lines $A^3$, $A^4$. It will be appreciated that the two halves $b^1$, $b^2$, of the phase B and the two halves $c^1$, $c^2$ of the phase C have their bars connected in the same way as the bars of phase A. When it is desired to stop the motor, the aforesaid rotating magnetic field is replaced by a six-pole pulsating magnetic field as shown in Figure 4 with the effect that the rotor is not pulled round about its axis but, instead is brought to a standstill in the manner described below. The pulsating six-pole field is produced by cutting out the three-phase A.C. supply through conductors 1, 2, 3 (Figure 1) and replacing it by a single-phase A.C. supply through conductors 1x, 1y (Figure 3) while short-circuiting the parts $a^2$, $b^2$, $c^2$ of the winding. This is effected by the switching mechanism shown in Figure 5. This comprises 5 coupled switch arms 4 . . . 8 which are shown in the "off" position. When the motor is running, the switch arms are in the left hand position in which two of the three-phase main conductors B, Y are connected respectively to two corners of the delta connection by way of the arms 7, 8 and the conductors 2, 3. The third mains conductor R is connected to the third corner of the delta connection through the arms 6, 5 and the conductors 1x, 1y. In order to brake the rotor the switch arms 4 . . . 8 are swung over to their right-hand positions in which the arm 6 short-circuits the half-phase windings $c^2$ through the conductor 1x and a conductor 9, the arm 7 short-circuits the half-phase winding $b^2$ by way of the conductor 2, and a conductor 10, and the arm 8 short-circuits the half-phase winding $a^2$ by way of the conductor 3 and a conductor 11. Simultaneously the arms 4, 5 connect the main conductors R and B to the open-delta connection through the conductros 1x, 1y.

It will be observed, in the arrangement described above with reference to Figures 1 to 5, that a minimum of seven terminals are required for direct connection to the delta-connected windings, that the single-phase pulsating field has three times as many stationary magnetic poles as there are rotating magnetic poles due to the fundamental three-phase field, and that, during braking, the three half-phase windings that are short-circuited are displaced ninety electrical degrees from the winding producing the six-pole magnetic field. It is further to be noted that if the short-circuited half-phase windings were not present, the motor would have the characteristic of a single-phase machine having three times as many poles as the fundamental three-phase field. The rotor would, therefore, rotate at approximately one-third of the three-phase synchronous speed. There would be combined regenerative braking and reversed current braking at higher speeds, and combined reversed current braking and motoring at lower speeds. The net braking torque at the higher speeds would be considerably greater than the net motoring torque at the lower speeds. The short circuited portion of the stator winding, which is displaced by an electrical angle of 90 degrees from the excited portion of the stator winding, has, by virtue of the energy absorbed by the currents induced therein, the effect of increasing the reversed current braking torque and reducing the regenerative and motoring torques. In the present example, the resistance of the rotor winding during triple-pole operation is sufficiently high for there to be no net motoring torque. The braking torque is of the same order as the effective accelerating torque of the machine when connected to the normal 3-phase supply.

Where the high-resistance rotor is replaced by a low-resistance squirrel-cage rotor, the motor cannot be brought to a standstill by the above asymmetrical triple-pole connection alone. However the method described above reduces the rotor speed to below one-third of its three-phase synchronous speed, so that about 90% of its stored energy is absorbed, the remaining 10% being absorbed by mechanical or other means, such as reversed current braking.

The braking torque is sensitive also to other factors. For example, it can be increased by "short chording," that is to say by arranging the stator winding in planes that are not diametrical, without having any appreciable effect on the three-phase running characteristic of the machine. Reduced braking torques can be achieved by applying phase voltage instead of line voltage to the conductors 1x, 1y. Further variations in braking torque can be obtained by inserting an impedance either in the short-circuited or in the excited portion of the stator winding, or in both. Special arrangements which make it possible to obtain low rotor resistance during normal three-phase running and high rotor resistance during triple-pole braking to standstill are described below.

Figure 6:
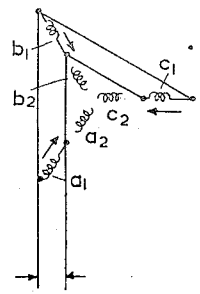
Figs. 6 and 7 are circuit diagrams respectively of star and delta stator windings, each showing a method of connecting single-phase current to half-phase windings therein while the remaining half-phase windings are shown disconnected.
Figure 7:
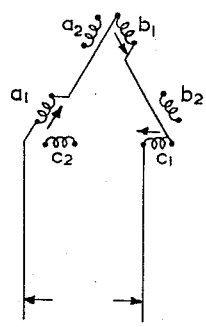
Figure 8:
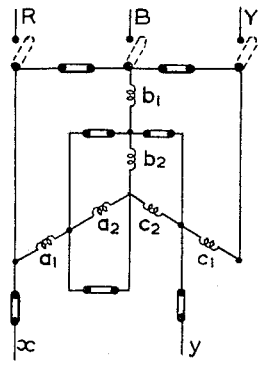
Fig. 8 is a circuit diagram showing switch means for short-circuiting the remaining half-phase windings of a stator winding resembling that of Fig. 6.
Figure 9:
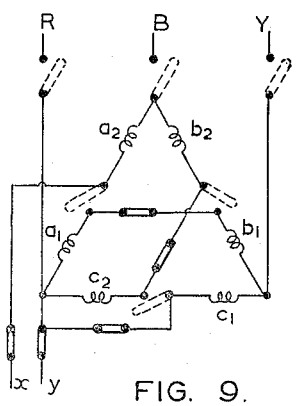
Fig. 9 is a circuit diagram showing switch means for short-circuiting the remaining half-phase windings of a stator winding resembling that of Fig. 7.
Figure 10:
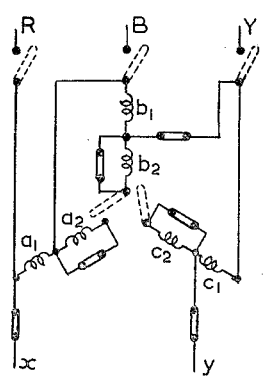
Fig. 10 is a circuit diagram showing a modification of Fig. 8.

Yet again, variations in the speed-torque characteristic can be obtained by adopting one or other of the alternative methods of connecting the six half-phase windings shown in Figures 6 to 14. In Figure 6 it will be seen that the phase windings are star-connected and that the single-phase A.C. connection is made to the half-phase windings $a^1$, $b^1$, $c^1$, in parallel, while in Figure 7 there is a delta connection with the single-phase connection to the half-phase windings $a^1$, $b^1$, $c^1$ in series. In each of these arrangements the half-phase windings $a^2$, $b^2$, $c^2$ have to be short-circuited and Figure 8 shows a way in which this may be done so far as the star connection is concerned, this circuit being intended to receive the single-phase supply by way of a step-down transformer (not shown). Figure 9 shows a delta-connected arrangement and the manner in which the half-phase windings $a^1$, $b^1$, $c^1$ may be short-circuited while single-phase alternating current is supplied by the application of line voltage, phase voltage or a transformer to the half-phase windings $a^2$, $b^2$, $c^2$, in series. Figure 10 shows a star-connected arrangement with the half-phase windings $a^2$, $b^2$, $c^2$ short-circuited while single-phase alternating current is supplied to the half-phase windings $a^1$, $b^1$, $c^1$, in series from line voltage, phase voltage or a transformer. It will be observed that while the arrangement of Figure 8 requires only seven terminals, those of Figures 9 and 10 require nine terminals.

Figure 11:
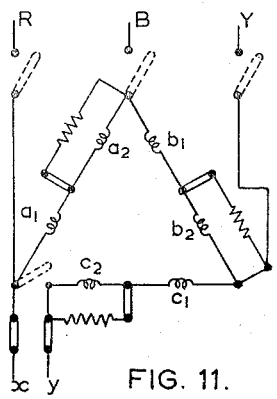
Fig. 11 is a circuit diagram showing a modification of Fig. 9.

Instead of short-circuiting the three half-phase windings, the short circuiting connector may be replaced by a resistance, an inductance, a capacitance or any combination of these elements. Thus Figure 11 shows a modification of the circuit shown in Figure 3. In this case the half-phase windings $a^2$, $b^2$, $c^2$ are not short-circuited but are shunted by resistances. The motor will therefore self start and accelerate to one third of full speed in the manner of a "split-phase" single-phase induction motor.

Figure 12A:
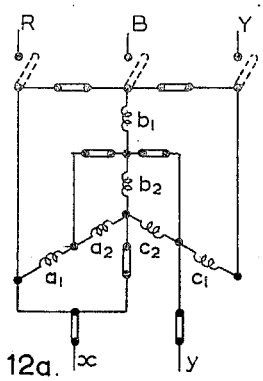
Fig. 12a is a circuit diagram showing a modification of Fig. 8 in which the remaining half-phase windings are divided into two short-circuited groups.

In a further alternative, none of the half-phase windings is short-circuited but instead the two sets of three half-phase windings are connected similarly (either in series or in parallel) and the two circuits so obtained are connected in parallel across a single-phase supply. Thus Figure 12a and 13 show the arrangement of Figures 8 and 9 modified according to this principle. In the star connection of Figure 12a the set of half-phase windings $a^1$, $b^1$, $c^1$ are in parallel with one another, as also are the windings in the set $a^2$, $b^2$, $c^2$, these two sets being connected in parallel to the single-phase A.C. supply via a transformer (not shown). In Figure 13 a delta connection is shown with the half-phase windings $a^1$, $b^1$, $c^1$, in series and the half-phase windings $a^2$, $b^2$, $c^2$ in series. Figure 12b shows how all six half-phase windings of a delta connection can be connected in parallel with each other and to a single-phase A.C. supply. The connection to the single-phase A.C. supply may be made via a transformer, or a series impedance, or both a transformer and a series impedance. Only six stator terminals are required. Each of these arrangements produces an excitation of the motor which is the resultant of simultaneous and equal positive and negative sequence excitation of the two-phase winding effectively comprising each arrangement.

Figure 14 shows a modification of the circuit of Figure 13 in which the phase angle of the current flowing through the half-phase windings $a^2$, $b^2$, $c^2$ is altered with respect to that of the half-phase windings $a^1$, $b^1$, $c^1$ by means of a condenser 12. This provides self-starting on the one-third speed motoring characteristics.

Returning to Figure 6 it will be seen that if the second three half-phase windings $a^2$, $b^2$, $c^2$ are connected in the same way as the first three half-phase windings $a^1$, $b^1$, $c^1$, a winding very similar to that of a balanced two-phase induction motor is produced. When this winding is supplied by a balanced or unbalanced two-phase supply as shown in Figure 15, the motor behaves like a two-phase induction motor having three times as many poles as when the windings are supplied as normal three-phase star connected windings. The machine, therefore, operates as a motor at speeds below one-third of the normal three-phase synchronous speed and brakes regeneratively at speeds above this speed. However in contrast with the single-phase braking connection, the two-phase connection is self-starting. The peak motoring torque is closer to the peak braking torque and regenerative braking is even more efficient then in the case of the single-phase braking connections at speeds above one third of normal synchronous speed.

Figure 16 shows the adaptation of the arrangement of Figure 15 to a delta connection.

In each of Figures 8 to 16, simple switching arrangements are shown for changing over the supply from three phase current to single phase current (Figures 8 to 14) or two phase current (Figures 15 and 16). In each of these figures there are three conductors R, B, Y at the top for supplying the three phase current and conductors $x$, $y$ or $x$, $y$, $z$ at the bottom for supplying the single phase or two phase current. In each of these figures also there are switches shown closed in full lines and switches shown open in broken lines. The connections so made are, in each case, such as to supply the single phase or two phase current in the required manner, while the three phase supply is cut off. By opening the full line switches and closing the broken line switches, the three phase current is applied in the required manner while the single phase or two phase current is cut off.

Where stators such as those shown in Figures 15 and 16 are to be fed with unbalanced two-phase currents, these can be obtained directly from the three-phase supply or by way of a transformer or a series impedance. Where the two-phase supply is obtained directly from the three-phase mains, the two groups of half-phase windings may either be connected across the three-phase supply or across two phases and the neutral of the three-phase supply. The phase angle between the two currents is then either 60 or 120 degrees. Balanced two-phase currents (i.e. those having a phase angle of 90 electrical degrees) can be obtained by a number of methods and one of these is shown in some detail in Figure 17. This has the advantage of balanced operation and flexibility, because the transformer can be wound for any output voltage. The unbalanced operation from the three-phase supply has the advantage of cheapness and is therefore more attractive when braking to one-third speed and infrequent operation at one-third speed is required.

Figure 17:
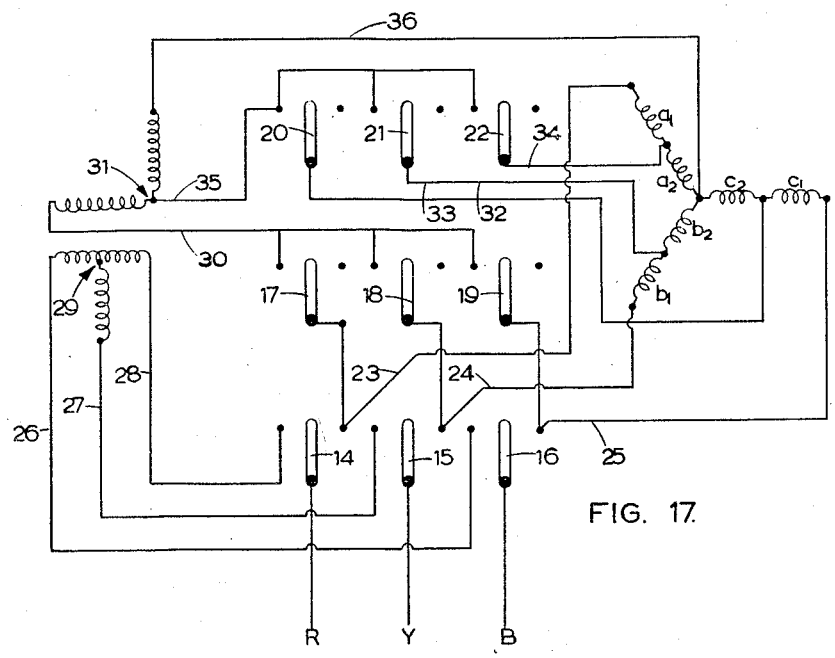
Fig. 17 is a circuit diagram showing a modification of Fig. 15 incorporating a three-phase to two-phase transformer.

Figure 17 shows nine coupled switch arms 14 . . . 22 which are shown in the "off" position. When the motor is running at full speed the switch arms are turned to their right hand positions so that the three-phase conductors R, Y, B are connected respectively by way of the switch arms 14, 15, 16 and the conductors 23, 24, 25 to the outer ends of the star-connected stator windings $a^1$, $a^2$, $b^1$, $b^2$, $c^1$, $c^2$.

To reduce the speed to one-third of normal speed, the switch arms 14 . . . 22 are moved over to the left-hand positions. By this means the mains conductors R, Y, B, are connected through the switch arms 14, 15, 16 and the conductors 26, 27, 28, with the three-phase part 29 of a three-phase to two-phase transformer. The phase ends of the star windings are connected together by way of the conductors 23, 24, 25, the arms 17, 18, 19, and a conductor 30 to one phase of the two-phase part 31 of the transformer. The other phase is connected by a conductor 36 to the star point of the motor. The three taps between the half-phase windings respectively in pairs $a^1$, $a^2$, $b^1$, $b^2$, $c^1$, $c^2$ are connected respectively by conductors 32, 33, 34, to the common conductor 35 of the two-phase part 31 of the transformer. The resulting winding arrangement is a balanced two-phase winding having three parallel circuits per phase. A minimum of seven motor terminals is required for this circuit.

Figure 18:
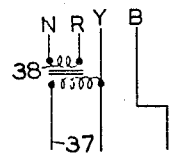
Figure 19:
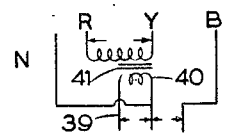

Figures 18 and 19 show two of the several alternative methods of supplying the motor with a balanced 2-phase three-wire supply without the need of a full two-phase to three-phase transformer as shown in Figure 17. In each figure a four-wire input comprises a neutral conductor N and three phase conductors R, Y, B. In Figure 18 two of the two-phase output conductors are constituted by the input conductors Y, B and the third output conductor 37 is supplied by a single-phase transformer 38 having its primary winding supplied at phase voltage by being connected across the input conductors N, R. The three two-phase output conductors are thus supplied at line voltage.

In Figure 19, on the other hand, the three output conductors 39, 40, and B are supplied at phase voltage by the use of a transformer 41. The primary winding of this is connected between the input conductors R, Y and the secondary between the output conductors 39, 40. The neutral wire N is led to the output conductor 40.

Figure 20A:
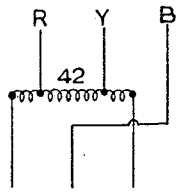
Figure 20B:
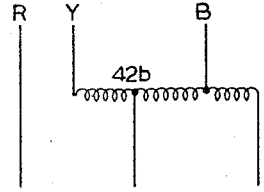
Figure 21:
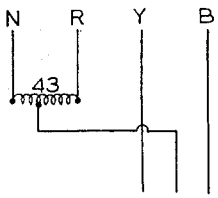

Other schemes of three-phase to two-phase conversion using single phase auto-transformers and giving other alternative two-phase output voltages are shown in Figures 20a, 20b and 21. In Figure 20a the outer limbs of the auto-transformer 42 have 0.367 times as many turns as the turns of the winding connected across R and Y. The 2-phase output voltage of this arrangement is 1.225 times the three-phase line voltage. In Figure 20b, the outer limb of the auto-transformer 42b has 0.367 times as many turns as the turns of the winding connected across B and Y, whilst the latter winding is centre tapped. The 2-phase output voltage of this arrangement is 0.867 times the 3-phase line voltage. In Figure 21 the auto-transformer 43 is split into two sections. The section of the winding connected to the neutral N has 36.7% of the total turns and the section connected to the line R has the remaining 63.3% of the total turns. The 2-phase output voltage of this arrangement is .707 times the 3-phase line voltage.

The secondary or rotor circuit used with primary windings which are constructed in accordance with this invention may be of the solid iron type or of the single or multiple cage type, or a wound arrangement, or it may be a combination of cage and wound arrangements. Both the primary or stator winding and the secondary or rotor winding may be of the single or double layer type and the rotor winding may be either complete in itself or it may be connected by way of slip-rings to external rheostats.

The rotor winding will react usefully with the stator winding provided that the components of fundamental or third-harmonic M.M.F. which are induced in the rotor winding are balanced by corresponding components of M.M.F. in the whole or in part of the stator winding.

It has been stressed earlier in the specification that for braking to standstill the equivalent resistance of the secondary winding during triple-pole operation must be approximately equal to, and preferably greater than, the total leakage reactance per triple-pole phase. Except in the case of drives where the mechanical load is of minor importance and where accelerating and braking represent a large part of the duty cycle, as in the case of centrifuges, a conventional squirrel cage rotor having a sufficiently high resistance would result in objectionable high rotor losses and slip during normal three-phase running. With a wound arrangement and external rotor resistances the equivalent triple-pole secondary resistance can be adjusted so that braking to standstill is always possible. Motors can also be constructed, which without the need for sliprings and external resistances, have a low or medium resistance during three-phase running and high secondary resistance during triple pole operation. Such a rotor may have two separate secondary windings of which one is a high-resistance low-reactance squirrel cage, while the second winding is a low resistance winding which will interact with the fundamental M.M.F. but will not interact with the triple-pole magnetic field. The latter winding may take the form of a conventional star connected winding wound for the fundamental poleage and permanently shorted at the phase ends, or it may be a permanently shorted winding having one or more turns per coil which has a coil span of ⅔ of the fundamental pole pitch, or again a cage winding with a common cage end connection at one side, and several end connections connecting together sets of bars, which are spaced ⅔ of the fundamental pole pitch, on the other side. A further possibility is to design the motor with a medium resistance rotor and a lower than normal leakage reactance so that the requirement for triple pole braking to standstill are fulfilled. A medium resistance three phase speed-torque characteristic can be obtained by increasing the three phase running reactance either by inserting a series choke which is cut out during braking, or by providing extra leakage reactance in the rotor end connections which is automatically reduced to approximately ⅑ of its fundamental value during triple pole operation.

Wound secondary windings for use in conjunction with the primary windings according to the invention can either consist of two separate conventional windings, or they may be single windings which may be suitable for resistance control at both speeds or for control at one speed only.

Figure 22:
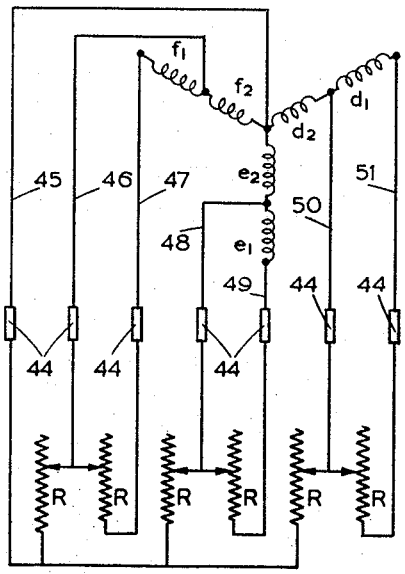
Figure 23:
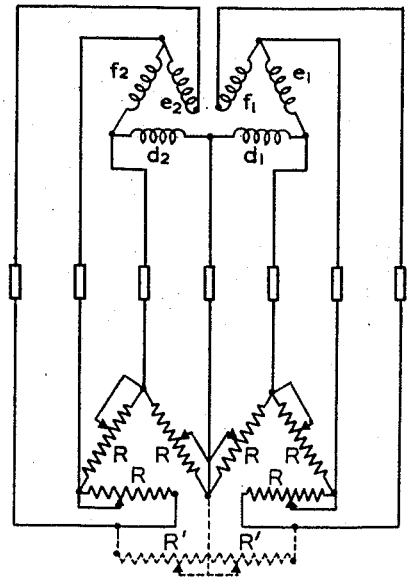

Figures 22 and 23 show respectively two forms of single rotor windings (with associated slipring rheostats $r$) that are suitable for use with the stator windings according to the invention. These figures show respectively star connected and delta connected three-phase rotor windings with each phase divided into two halves $d^1$, $d^2$, $e^1$, $e^2$, $f^1$, $f^2$. In each case the two halves of each phase are displaced from each other by 30 electrical degrees during normal three-phase operation.

In Figure 22 the star point of the rotor winding and the ends of the half phases are connected by conductors 45 ... 51 respectively to seven sliprings 44, the brushes of which are connected to six rheostats R as shown. Figure 23 shows a similar arrangement adapted to a delta wound rotor. It will be observed that in each case, each of the six rheostat resistances is associated with one of the six half phase windings so as to enable the half-phase windings to be short circuited to a greater or lesser extent according to the adjustment of the rheostat. The rheostats R may be used both on normal three-phase and in triple-pole operation, in order to control the motor torque. Two further rheostats $R^1$ may be included, if desired, as shown in Figure 23. These may be preset to facilitate the transition from normal three-phase to triple-pole operation, and vice versa. The rheostats $R^1$ may also be used to control the triple-pole operation of the motor with or without the use of the six rheostats R.

Figure 24:
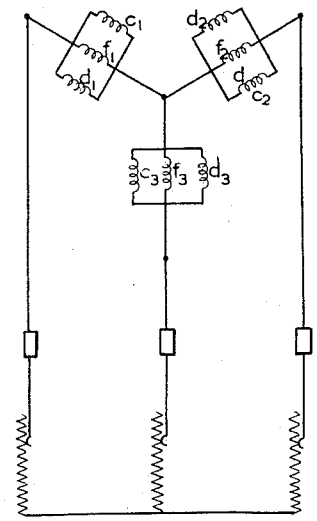
Figure 25:
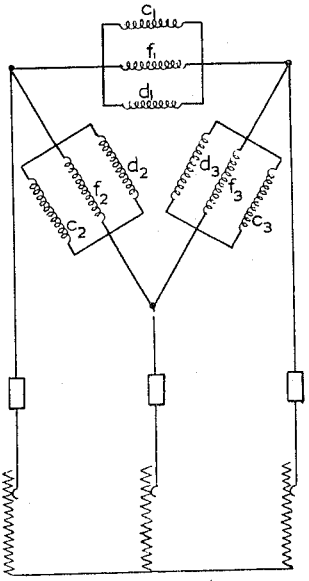

If in the case of Figure 22 the star point, the three centre taps 46, 48, 50 and the three phase ends 45, 47, 49 are respectively brought out to three separate sliprings and the sliprings 44 and rheostats R are omitted the winding will behave as a permanently short circuited secondary for normal three-phase operation, but during triple-pole operation it will behave as a two-phase slipring winding and its triple-pole motoring and braking characteristics can be controlled by means of two external rheostats. Alternatively, when it is not required to vary the two rheostats during triple-pole operation, all the sliprings may be omitted and the two rheostats be fitted internally on the rotor. Further alternatives of the secondary winding which behave as though permanently short-circuited for normal 3-phase operation, but allows secondary resistance control of the triple-pole motoring and braking characteristics are shown in Figures 24 and 25. In this case each phase of a three-phase winding is divided into three equal parts, each occupying one-third of the total fundamental phase-spread. The one-third-phase windings $d^2$, $e^2$, $f^2$ of Figures 24 and 25 are reverse connected, compared with the remaining one-third-phase windings $d^1$, $e^1$, $f^1$, $d^3$, $e^3$, $f^3$ when the phase-spread is 60 degrees. Again in the case of Figures 24 and 25, when it is not required to vary the three rheostats during triple-pole operation, all the sliprings may be omitted and the three rheostats be fitted internally on the rotor.

Other wound secondary arrangements are known which will provide resistance control at both speeds or at one speed only and amongst them there are two-phase, 5-phase and 9-phase arrangements.

We claim:

1. In a three-phase induction motor, the combination of a primary winding having each of its phases divided into two halves, means for short-circuiting one of the half phase windings in each phase winding, means for supplying the three-phase current necessary for running the motor at full speed, to the full primary winding, and means for supplying single-phase current to the other half phase-winding in each phase-winding when the first half phase winding is short circuited.

2. In the three-phase induction motor according to claim 1, said short-circuiting means being arranged to short-circuit each of said first-mentioned half-phase windings individually.

3. In the three-phase induction motor according to claim 1, three impedances allocated respectively to said first-mentioned half-phase windings, said short-circuiting means being arranged to short-circuit each of said first-mentioned half-phase windings individually through its respective impedance.

4. In the three-phase induction motor according to claim 1, said short-circuiting means being arranged to short-circuit said first-mentioned half-phase windings by connecting them together in series.

5. In the three-phase induction motor according to claim 1, said short-circuiting means being arranged to short-circuit said first-mentioned half-phase windings by connecting them together in parallel.

6. In a three-phase induction motor, the combination of a single primary three-phase winding having each of its phases divided into two parts, a stator supporting structure on which said primary winding is wound and arranged so that the magnetic axes of said two parts in each said phase are displaced from each other by thirty electrical degrees, means for supplying the three-phase current necessary for running the motor at full speed to the full primary winding and for alternatively supplying a second current incorporating less than three phases to at least three of said parts of said winding so as to triple the number of poles produced by said winding, and a secondary rotor winding for increasing the running reactance during three-phase operation but reducing the running reactance during triple-pole operation, said secondary winding consisting of a single delta connected winding having each of its phases divided into two halves, rheostats allocated respectively to said half-phase secondary windings, and connections including slip-rings and brushes between said rheostats and half-phase secondary windings arranged to enable said half-phase secondary windings to be short-circuited with variable amounts of resistance, and said secondary winding being adapted to produce a high resistance such that said motor is brought rapidly to a standstill when said second current is supplied to said primary winding.

References Cited in the file of this patent

UNITED STATES PATENTS 2,816,258    Norman  ---------------- Dec. 10, 1957

FOREIGN PATENTS 434,451    Great Britain ------------ Sept. 2, 1935